United States Patent
Lee et al.

(10) Patent No.: US 9,829,634 B2
(45) Date of Patent: Nov. 28, 2017

(54) BUNDLED OPTICAL FIBER PROBE

(71) Applicants: KYUNGPOOK NATIONAL UNIVERSITY INDUSTRY-ACADEMIC COOPERATION FOUNDATION, Daegu (KR); GWANGJU INSTITUTE OF SCIENCE AND TECHNOLOGY, Gwangju (KR)

(72) Inventors: Ho Lee, Daegu (KR); Ik Bu Sohn, Gwangju (KR); Chang Hwan Kim, Daegu (KR); Myung Jin Jeon, Daegu (KR); Ho Yong Park, Daegu (KR)

(73) Assignees: Kyungpook National University Industry-Academic Cooperation Foundation, Daegu (KR); Gwangju Institute of Science and Technology, Gwangju (KR)

( * ) Notice: Subject to any disclaimer, the term of this patent is extended or adjusted under 35 U.S.C. 154(b) by 82 days.

(21) Appl. No.: 14/761,859

(22) PCT Filed: Jan. 16, 2014

(86) PCT No.: PCT/KR2014/000464
§ 371 (c)(1),
(2) Date: Nov. 12, 2015

(87) PCT Pub. No.: WO2014/112801
PCT Pub. Date: Jul. 24, 2014

(65) Prior Publication Data
US 2016/0062041 A1    Mar. 3, 2016

(30) Foreign Application Priority Data
Jan. 18, 2013 (KR) .......... 10-2013-0005812

(51) Int. Cl.
| | | |
|---|---|---|
| G02B 6/26 | (2006.01) | |
| G02B 6/04 | (2006.01) | |
| F21V 8/00 | (2006.01) | |
| G02B 6/36 | (2006.01) | |
| G02B 6/35 | (2006.01) | |

(52) U.S. Cl.
CPC ........... *G02B 6/262* (2013.01); *G02B 6/0008* (2013.01); *G02B 6/04* (2013.01); *G02B 6/3624* (2013.01); *G02B 6/353* (2013.01)

(58) Field of Classification Search
CPC ........ G02B 6/0008; G02B 6/036; G02B 6/04; G02B 6/262; G02B 6/353; G02B 6/36; G02B 6/3624
See application file for complete search history.

(56) References Cited

U.S. PATENT DOCUMENTS 5,152,761 A * 10/1992 Muller ................. A61B 18/245
385/81
5,257,173 A * 10/1993 Ohmamyuda ........ G01S 7/4814
362/235

(Continued)

FOREIGN PATENT DOCUMENTS

| CN | 102088896 A | 6/2011 |
|---|---|---|
| CN | 102596023 A | 7/2012 |

(Continued)

OTHER PUBLICATIONS

International Search Report, corresponding to PCT/KR2014/000464, dated Apr. 16, 2014, 4 pages.

*Primary Examiner* — Ellen Kim
*Assistant Examiner* — Mary A El Shammaa
(74) *Attorney, Agent, or Firm* — Lewis Roca Rothgerber Christie LLP

(57) ABSTRACT

A bundled optical fiber probe according to an embodiment of the present invention includes: a forward irradiation unit including a forward irradiation optical fiber disposed at the (Continued)

center thereof, the forward irradiation optical fiber having a flat end surface; and a side irradiation unit including a side irradiation optical fiber disposed at the periphery of the forward irradiation unit, the side irradiation optical fiber having an inclined end surface to laterally reflect a laser beam, wherein the forward irradiation unit and the side irradiation unit can be formed as a single bundle.

8 Claims, 11 Drawing Sheets

(56) References Cited

U.S. PATENT DOCUMENTS

| | | | | |
|---|---|---|---|---|
| 5,302,999 | A | * | 4/1994 | Oshida ................. F21V 13/12 355/1 |
| 5,318,024 | A | * | 6/1994 | Kittrell ............. A61B 1/00096 600/478 |
| 5,953,477 | A | * | 9/1999 | Wach ................ A61B 5/14546 385/115 |
| 2010/0176311 | A1 | * | 7/2010 | Segi .................... G02B 6/4298 250/494.1 |

FOREIGN PATENT DOCUMENTS

| | | |
|---|---|---|
| JP | 2000-024000 | 1/2000 |
| JP | 2000-102886 | 4/2000 |
| JP | 2006-343402 | 12/2006 |
| JP | 2010-158358 | 7/2010 |
| KR | 10-2009-0020026 | 2/2009 |
| KR | 10-2011-0112269 | 10/2011 |

* cited by examiner

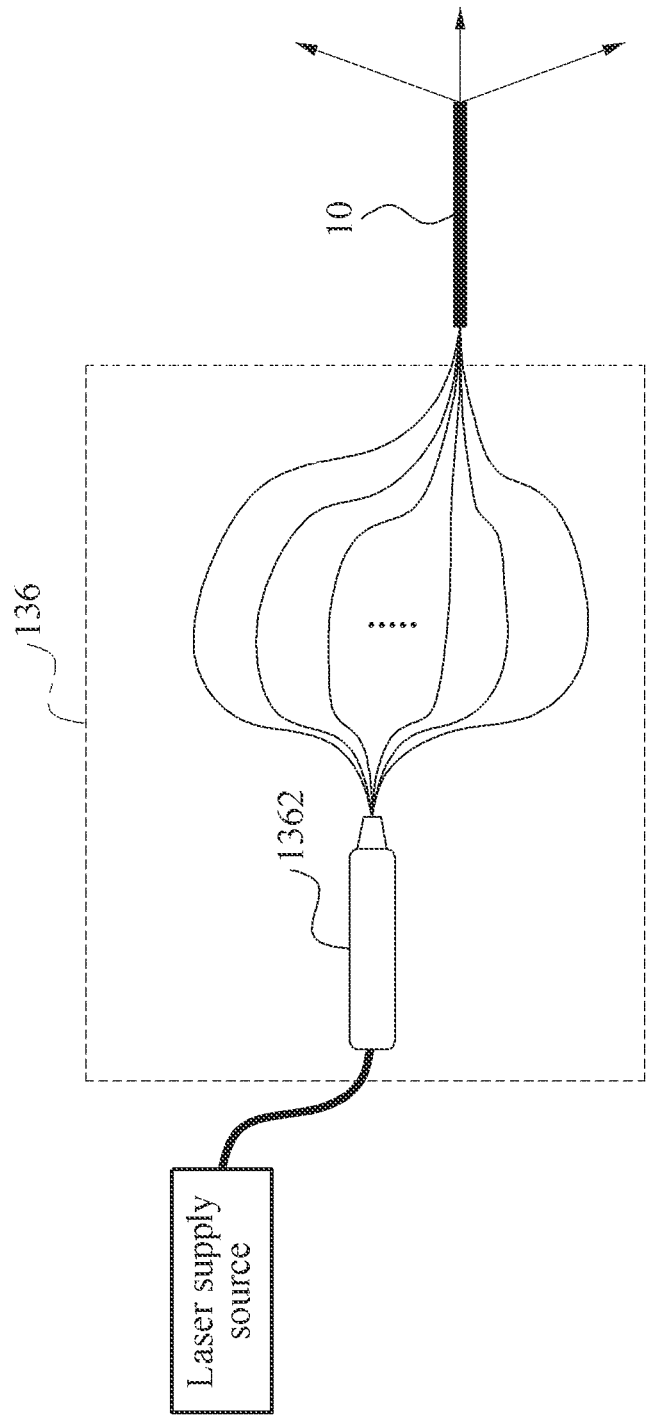

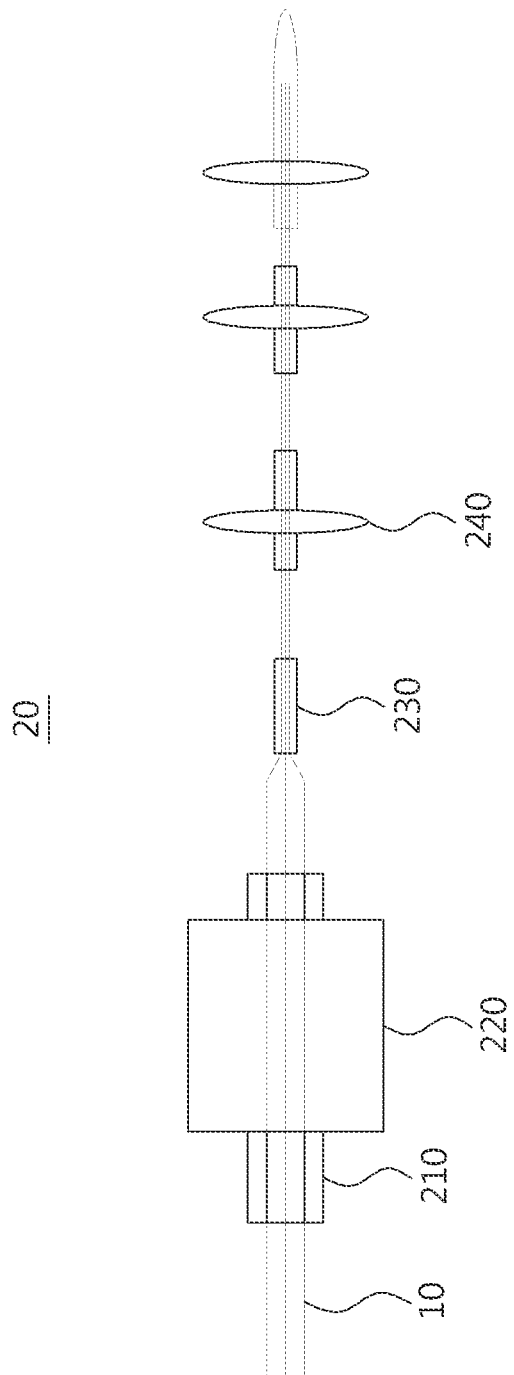

BUNDLED OPTICAL FIBER PROBE

CROSS-REFERENCE TO RELATED APPLICATION(S)

This application is a National Phase Patent Application and claims priority to and the benefit of International Application Number PCT/KR2014/000464, filed on Jan. 16, 2014, which claims priority to Korean Patent Application Number 10-2013-0005812, filed on Jan. 18, 2013, the entire content of all of which are incorporated herein by reference.

TECHNICAL FIELD

Embodiments relate to a bundled optical fiber probe, and more particularly, to a bundled optical fiber probe for forming a bundle of a forward irradiation optical fiber and a side irradiation optical fiber.

RELATED ART

An optical fiber probe is employed for a system miniaturization in an image system using light.

A light source having a relatively wide bandwidth and an optical fiber probe operating in a single mode in a relatively wide wavelength band are required to realize a high resolution in a tomography system using light based on an optical fiber probe.

An optical fiber probe capable of performing a lateral irradiation is utilized to achieve the miniaturization of an optical imaging system or to acquire a lateral image of a very small size sample such as a blood vessel.

A variety of methods may be employed to manufacture the optical fiber probe capable of performing a lateral irradiation in a small size. For example, the following three methods may be utilized.

The first method is a method of installing and using a bulk type device, such as a micro prism or a reflective mirror, at an end of an optical fiber, the second method is a method of bonding a device, such as a cylindrical grin lens or a commercialized ball lens, at an end of a single mode optical fiber, and cutting or polishing the grin lens or the ball lens at an appropriate angle, and the third method is a method of sequentially bonding a grin lens and a micro optical distributor at an end of a single mode optical fiber.

Korean Patent Publication No. 10-2009-0020026, filed on Aug. 22, 2007, discloses an optical fiber probe for side imaging and a method of manufacturing the same.

As described above, research on an optical fiber probe has been conducted.

DETAILED DESCRIPTION

Technical Subject

An aspect of embodiments provides a bundled optical fiber probe that may perform a multidirectional irradiation using a single optical fiber probe by including a forward irradiation optical fiber and a side irradiation optical fiber as a bundle.

Another aspect of embodiments provides a bundled optical fiber probe that may individually control a laser power or an irradiation direction with respect to a forward irradiation optical fiber or a side irradiation optical fiber.

Another aspect of embodiments provides a bundled optical fiber probe that may perform a three-dimensional laser control by providing ends of forward irradiation optical fibers or side irradiation optical fibers at different heights.

Another aspect of embodiments provides a bundled optical fiber probe that may control a laser side irradiation angle from a side irradiation optical fiber using a total internal reflection or a metal reflective film.

Another aspect of embodiments provides a bundled optical fiber probe manufacturing apparatus that may easily control an irradiation direction or a height of a forward irradiation optical fiber or a side irradiation optical fiber, may simplify a manufacturing process, and may minimize damage from an external impact.

Solution

According to an embodiment, there is provided a bundled optical fiber probe including a forward irradiator including a forward irradiation optical fiber disposed at the center of the bundled optical fiber probe, an end of the forward irradiation optical fiber being provided as a flat surface, and a side irradiator including a side irradiation optical fiber disposed at the periphery of the forward irradiator, an inclined surface being formed at an end of the side irradiation optical fiber to laterally reflect a laser beam, wherein the forward irradiator and the side irradiator are formed as a single bundle.

According to an aspect, the bundled optical fiber probe may further include a controller configured to individually control the forward irradiation optical fiber and the side irradiation optical fiber. The controller may be configured to individually adjust a laser irradiation direction or a laser power.

According to an aspect, the controller may include a laser beam splitter configured to split the laser beam into the same number of laser beams as the number of forward irradiation optical fibers and side irradiation optical fibers, a beam switch configured to selectively block a path of the laser beam, and a lens configured to transmit the laser beam having passed through the beam switch to the forward irradiation optical fiber or the side irradiation optical fiber.

According to an aspect, the controller may include a coupler configured to split and couple the laser beam, and a plurality of couplers may be provided in series or in parallel.

According to an aspect, inclined surfaces may be formed at different angles on the side irradiation optical fibers, and an angle of the inclined surface may be selected based on a total internal reflection of the laser beam.

According to an aspect, a laser irradiation angle may be changed by coating the inclined surface of the side irradiation optical fiber with a reflective metal and thereby forming a metal reflective film.

According to an aspect, the forward irradiation optical fibers or the side irradiation optical fibers may have different diameters or may be disposed at different heights.

According to an aspect, the bundled optical fiber probe may further include a glass tube configured to encompass an end of the bundled optical fiber probe. An inner diameter of the glass tube may correspond to an outer diameter of the bundled optical fiber probe.

According to an embodiment, there is provided a bundled optical fiber probe manufacturing apparatus including an optical fiber chuck configured to fix a forward irradiation optical fiber or a side irradiation optical fiber, a chuck fixing jig configured to mount to the optical fiber chuck and to fix the optical fiber chuck, and a circle clamp configured to fix the polymer tube or to fix a glass tube that encompasses an end of the optical fiber.

According to an aspect, the optical fiber chuck may be rotatably mounted to the chuck fixing jig, and may be configured to adjust an irradiation direction by the side irradiation optical fiber through a rotation of the optical fiber chuck.

According to an aspect, the chuck fixing jig may include the number of holes corresponding to the number of optical fibers.

Effect

A bundled optical fiber probe according to embodiments may perform a multidirectional irradiation using a single optical fiber probe by including a forward irradiation optical fiber and a side irradiation optical fiber as a bundle.

Also, a bundled optical fiber probe according to embodiments may individually control a laser power or an irradiation direction with respect to a forward irradiation optical fiber or a side irradiation optical fiber.

Also, a bundled optical fiber probe according to embodiments may perform a three-dimensional laser control by providing ends of forward irradiation optical fibers or side irradiation optical fibers at different heights.

Also, a bundled optical fiber probe according to embodiments may control a laser side irradiation angle from a side irradiation optical fiber using a total internal reflection or a metal reflective film.

Also, a bundled optical fiber probe manufacturing apparatus according to embodiments may easily control an irradiation direction or a height of a forward irradiation optical fiber or a side irradiation optical fiber, may simplify a manufacturing process, and may minimize damage from an external impact.

BRIEF DESCRIPTION OF DRAWINGS

FIG. 5 illustrates a controller according to a third embodiment;

FIG. 9 illustrates a bundled optical fiber probe manufacturing apparatus according to an embodiment.

BEST MODE

Figure 1:
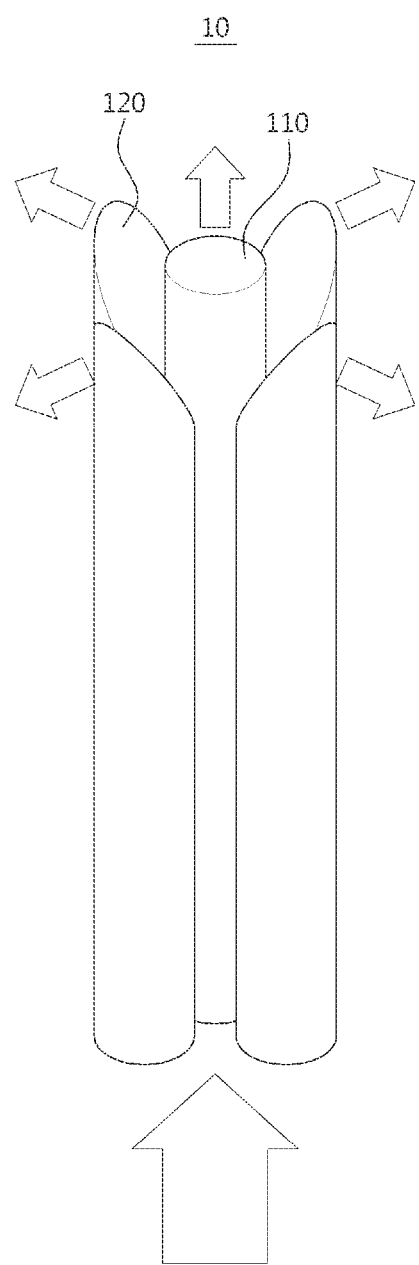
FIG. 1 is a perspective view of a bundled optical fiber probe according to an embodiment.

Hereinafter, embodiments will be described with reference to the accompanying drawings. The embodiments are not provided to be limiting of the present disclosure and like reference numerals refer to like elements throughout.

Figure 2:
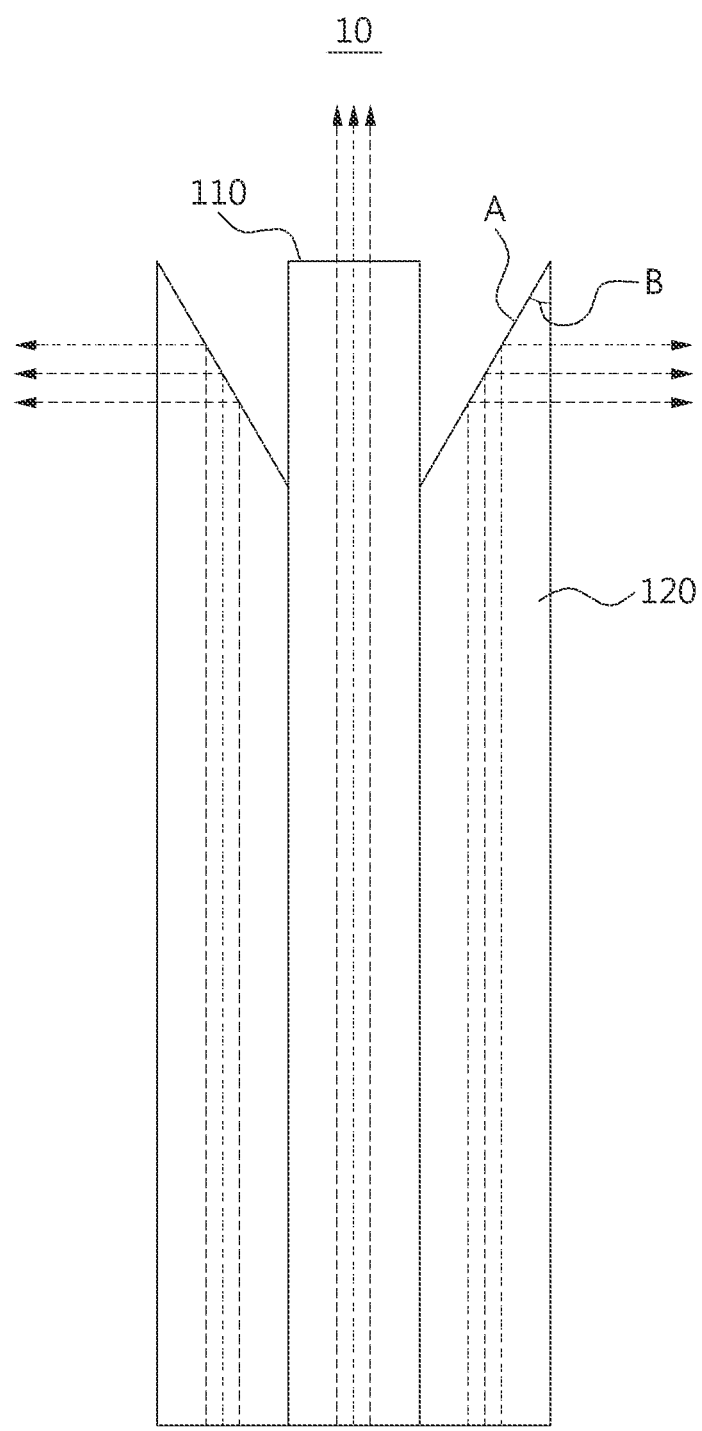
FIG. 2 illustrates an example of a laser passing using a bundled optical fiber probe according to an embodiment.

FIG. 1 is a perspective view of a bundled optical fiber probe according to an embodiment, and FIG. 2 illustrates an example of a laser passing using a bundled optical fiber probe according to an embodiment.

Referring to FIGS. 1 and 2, a bundled optical fiber probe 10 according to an embodiment may include a forward irradiator and a side irradiator.

The forward irradiator may be disposed at the center of the bundled optical fiber probe 10, and may include a forward irradiation optical fiber 110.

Here, the term "optical fiber" refers to a fiber that is produced by pulling a transparent dielectric material, for example, quartz glass and plastic, to be thin and long, and generally has a diameter of 0.1 to 1 mm. The center of the optical fiber is formed using a medium having a relatively high refractive index and the periphery of the optical fiber is covered with a medium having a relatively low refractive index. In detail, a core portion at the center and a cladding portion encompassing the core portion are provided in a dual cylindrical shape. The outside is coated with synthetic resin once or twice to protect the optical fiber from an external impact.

In addition, a total reflection principle may be applied as a principle of the optical fiber. For example, employed is a phenomenon that a complete reflection occurs when an incident angle of light meets a condition on a boundary between two transparent materials having different refractive indices. In detail, when the light passes through the optical fiber, cladding serves as the same functionality as a mirror and reflects the light. The reflected light passes through an inside of a core again and is reflected again from the cladding. The light is transmitted through the optical fiber by repeating the above process. As described above, a reflection occurs while a refraction does not occur on the boundary between the core and the cladding. Thus, the light may reach at an end of the optical fiber without being emitted.

Since an end of the forward irradiation optical fiber 110 is provided as a flat surface, laser may be irradiated straight in a lengthwise direction of the forward irradiation optical fiber 110 through the forward irradiation optical fiber 110.

A side irradiator may be disposed at the periphery of the forward irradiator.

The side irradiator may include a side irradiation optical fiber 120. Although the side irradiation optical fiber 120 is provided herein using the same material and the same diameter as those of the forward irradiation optical fiber 110, the side irradiation optical fiber 120 may be provided using a different material and a different diameter.

Also, FIG. 1 illustrates that a plurality of side irradiation optical fibers 120 is formed as a single bundle by encompassing the forward irradiation optical fiber 110 along the periphery of the forward irradiation optical fiber 110 based on the forward irradiation optical fiber 110. However, a bundle of the forward irradiator and the side irradiator may be provided in various shapes if necessary. The number of side irradiation optical fibers 120 may be variously determined.

An inclined surface A may be formed at an end of the side irradiation optical fiber 120. Accordingly, the side irradiation optical fiber 120 goes through a polishing process before being bundled with the forward irradiation optical fiber 110, to form the inclined surface A. For example, the inclined surface A may be formed at the end of the side irradiation optical fiber 120 by inserting the side irradiation optical fiber 120 into a chuck, by mounting the chuck to a polishing jig at an angle of inclination B, and by moving the polishing jig toward a grinder. A finishing may be performed on the inclined surface using a lapping sheet.

An angle at which a total internal reflection is available based on refractive indices of the cladding and the core of the side irradiation optical fiber 120 may be selected as the angle of inclination B. In detail, the angle of inclination B may be selected based on an angle at which all of the laser beams may be transferred to an inspection target through the side irradiation optical fiber 120 without being lost.

Due to the inclined surface A, a laser beam having passed through the optical fiber may be laterally reflected at the end of the side irradiation optical fiber 120. For example, when the angle of inclination B is 45 degrees, a laser beam having passed through the optical fiber may be reflected to an outside of the bundled optical fiber probe 10 in a direction orthogonal to an incident direction of the laser beam.

In detail, when the side irradiator includes a plurality of side irradiation optical fibers 120, an inclined surface may be formed on each of the side irradiation optical fibers 120 and thus, a laser beam may be irradiated in directions corresponding to the number of side irradiation optical fibers 120. Accordingly, a total number of irradiation directions may be equal to the number of forward irradiation optical fibers 110 and side irradiation optical fibers 120. Referring to FIG. 1, a total number of irradiation directions of the bundled optical fiber probe 10 including a single forward irradiation optical fiber 110 and four side irradiation optical fibers 120 may be five.

As described above, the bundled optical fiber probe 10 may irradiate laser beams into multiple directions including a forward and sides, through the forward irradiation optical fiber 110 and the side irradiation optical fiber 120 bundled in an appropriate shape. Also, the bundled optical fiber probe 10 may three-dimensionally irradiate laser beams by forming a bundle of the side irradiation optical fiber 120 and the forward irradiation optical fiber 110 using various shapes.

Hereinafter, an operation of the bundled optical fiber probe 10 will be briefly described.

When laser beams are incident to the forward irradiation optical fiber 110 and the side irradiation optical fiber 120, a laser beam may pass along an incident direction through each optical fiber. The laser beam may be transferred to an inspection target straight in the same direction as the incident direction at the end of the forward irradiation optical fiber 110, while the laser beam may be reflected laterally by the inclined surface A at the end of the side irradiation optical fiber 120. For example, when the forward irradiation optical fiber 110 is disposed at the center, the four side irradiation optical fibers 120 are disposed radially at intervals of 90 degrees along the periphery of the forward irradiation optical fiber 110, and the ends of the side irradiation optical fibers 120 are disposed on the same plane, four beams may be irradiated in an outer lateral radial form on the same plane through the four side irradiation optical fibers 120, respectively. In this manner, the bundled optical fiber probe 10 may irradiate laser beams multi-directionally.

Figure 3:
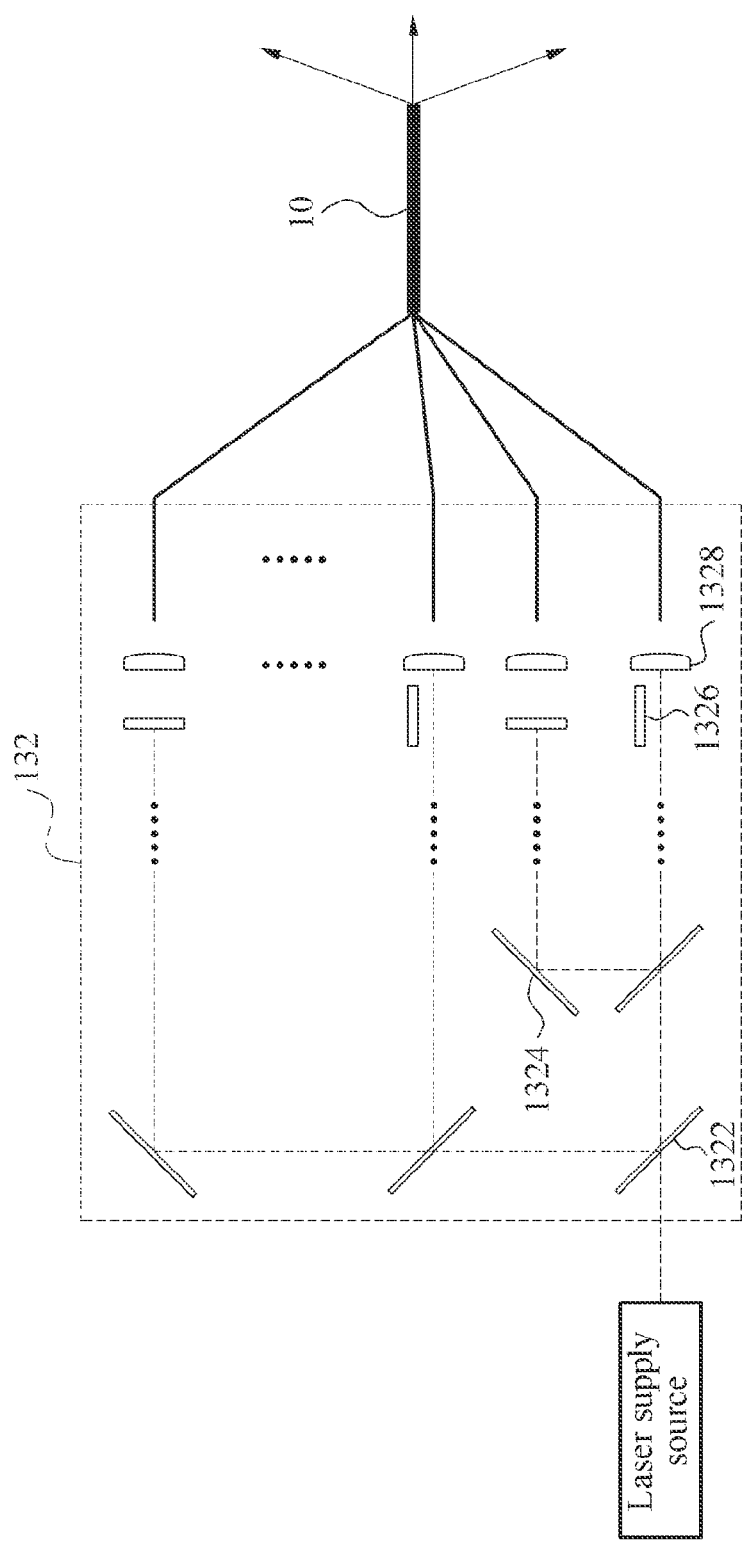
FIG. 3 illustrates a controller according to a first embodiment.
Figure 4:
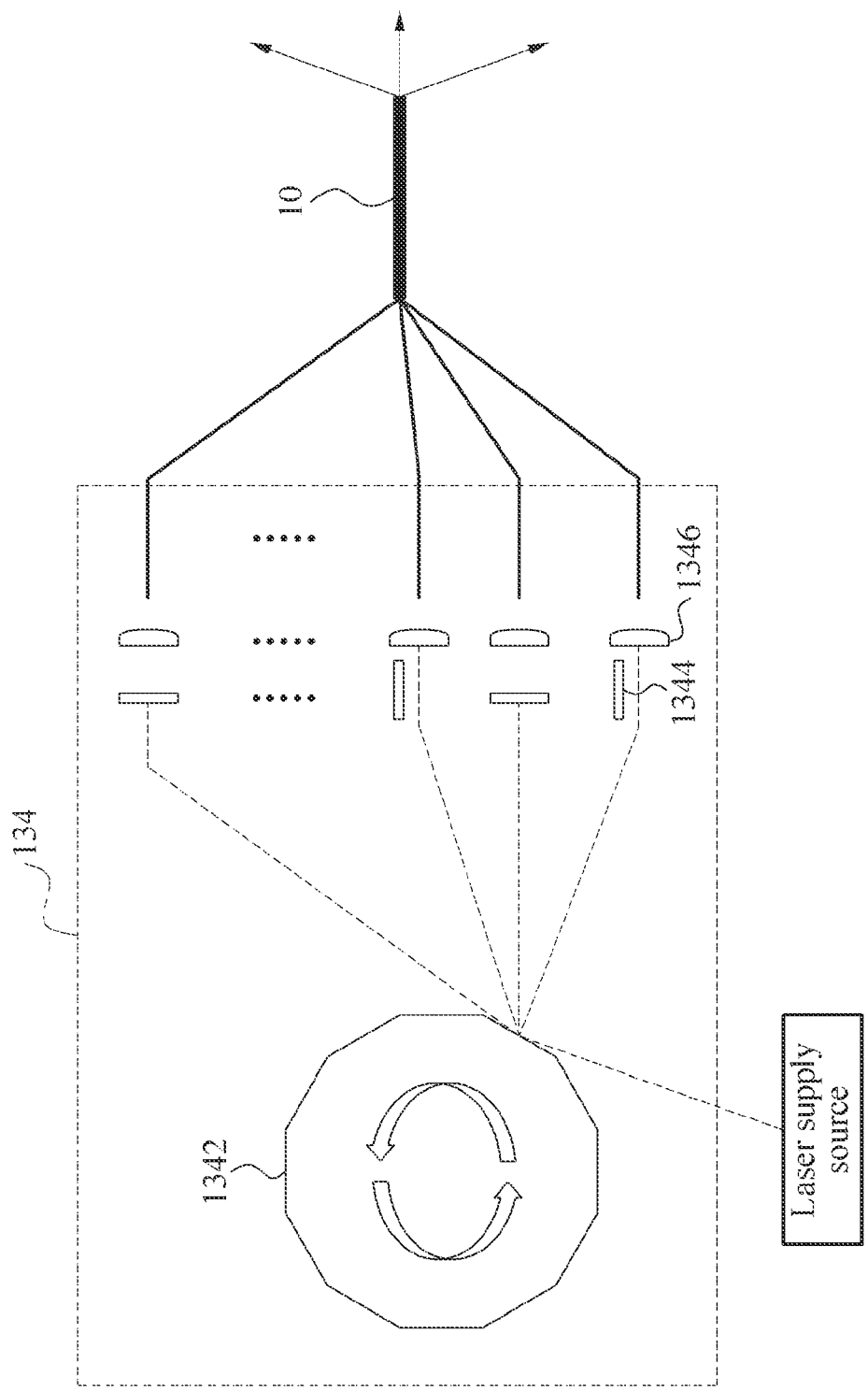
FIG. 4 illustrates a controller according to a second embodiment.

FIG. 3 illustrates a controller according to a first embodiment, FIG. 4 illustrates a controller according to a second embodiment, and FIG. 5 illustrates a controller according to a third embodiment.

Referring to FIGS. 3, 4, and 5, each of controllers 132, 134, and 136 may be connected to the corresponding bundled optical fiber probe 10.

Each of the controllers 132, 134, and 136 is provided between a laser supply source and the bundled optical fiber probe 10 and may individually control an irradiation direction or a laser power of a laser beam that passes through the forward irradiation optical fiber 110 and the side irradiation optical fiber 120.

Referring to FIG. 3, the controller 132 of the first embodiment may include a laser beam splitter 1322, a mirror 1324, a beam switch 1326, and a lens 1328.

The laser beam splitter 1322 indicates a reflector or other types of optical devices configured to reflect a portion of beams incident to the lens 1328 and to transmit another portion thereof. The laser beam splitter 1322 may split a laser beam generated from the laser supply source into the same number of laser beams as the number of forward irradiation optical fibers 110 and side irradiation optical fibers 120, or may transmit a laser beam incident to the laser beam splitter 1322.

In this example, reflection and transmission rates of the laser beam splitter 1322 may be adjusted, and the laser power may be adjusted based on the reflection and transmission rates. In detail, the laser power may also be split based on a ratio of the reflection rate to the transmission rate and thereby, transferred through each optical fiber. For example, when the ratio of the reflection rate to the transmission rate is 50:50, the laser power may also be split based on 50:50 and thereby transferred through each optical fiber.

Further, the laser beam split by the laser beam splitter 1322 may be reflected through the mirror 1324 disposed to be adjacent to the laser beam splitter 1322 and may change a path of the laser beam. For example, the path of the laser beam may vary based on an angle of inclination of the mirror 1324 or an incident angle of the laser beam split by the laser beam splitter 1322. However, the mirror 1324 may not be provided depending on embodiments.

A combination of the laser beam splitter 1322 and the mirror 1324 may be selected based on the number of forward irradiation optical fibers 110 and side irradiation optical fibers 120 and the reflection and transmission rates.

In detail, when the number of forward irradiation optical fibers 110 and side irradiation optical fibers 120 is four, the laser beam splitter 1322 and the mirror 1324 may be disposed to split a laser beam generated from the laser supply source into four laser beams and to provide individual paths. For example, to split the laser beam into four laser beams and to provide four individual paths in FIG. 3, three laser beam splitters 1322 and two mirrors 1324 are provided. However, it is only an example and the number of laser beam splitters 1322 and the number of mirrors 1324 or the arrangement of the laser beam splitter 1322 and the mirror 1324 may be various modified.

The beam switch 1326 capable of selectively blocking a path of a laser beam may be individually provided in a path of each laser beam having passed through the laser beam splitter 1322 or the mirror 1324. The beam switch 1326 may be switched to ON or OFF. When the beam switch 1326 is ON, the laser beam may pass. When the beam switch 1326 is OFF, the laser beam may be blocked. For example, it is possible to block an optical fiber of an undesired irradiation direction by turning OFF the beam switch 1326, and to enable an irradiation in the direction by turning ON the beam switch 1326 again.

The lens 1328 configured to transmit the laser beam having passed through the beam switch 1326 to the forward irradiation optical fiber 110 or the side irradiation optical fiber 120 may be disposed between the beam switch 1326 and the bundled optical fiber probe 10. The lens 1328 may be configured to form a focus by concentrating the respective split laser beams. FIG. 3 illustrates an example of transmitting a laser beam to the bundled optical fiber probe 10 by providing a cylindrical lens. However, it is only an example and any type of lenses capable of concentrating laser beams may be used.

According to an individual control of the beam switch 1326, a laser beam may be irradiated using only a portion of optical fibers among the forward irradiation optical fiber 110 and the side irradiation optical fibers 120. In an easy manner, it is possible to individually control optical fibers in a desired irradiation direction. Further, it is possible to individually control the laser power.

Referring to FIG. 4, the controller 134 of the second embodiment includes a scanning mirror 1342 instead of the laser beam splitter 1322 and the mirror 1324 included in the controller 132 of the first embodiment. Hereinafter, a description will be based on a difference and a description related to the same configuration as the controller 132 of the first embodiment will be omitted.

The scanning mirror 1342 may be fixed to an electronic device (not shown) that performs a horizontal pendulum motion according to a preset program. Since the electronic device moves the scanning mirror 1342 in both directions, for example, to the left and the right according to the preset program, a laser beam incident to the scanning mirror 1342 may be reflected bi-directionally to the left and the right. Through this reflection process, a one-dimensional laser beam may be converted to a two-dimensional laser beam by the scanning mirror 1342.

For example, the scanning mirror 1342 may be configured using a polygon mirror pr a galvanometer mirror. The polygon mirror moves a laser beam generated from a laser supply source at a consistent linear velocity, while the galvanometer mirror moves the laser beam generated from the laser supply source at an inconsistent linear velocity.

Also, the number of scanning mirrors 1342 may be determined based on the number of optical paths. For example, when a relatively large number of optical paths are required, a further number of scanning mirrors 1342 may be disposed around the laser supply source.

Laser beams reflected through the scanning mirror 1342 may be collected through a lens 1346. For example, the lens 1346 may form a focus by concentrating laser beams of the consistent linear velocity reflected by the polygon mirror or laser beams of the inconsistent linear velocity reflected by the galvanometer mirror.

Also, a beam switch 1344 is disposed before the lens 1346 and an irradiation direction of the laser beam may be individually controlled and be transferred to the bundled optical fiber probe 10. When a portion of the beam switches 1344 are turned OFF, laser beams corresponding to optical fibers may be blocked and the power of laser beams that pass through the optical fibers may become zero.

Referring to FIG. 5, the controller 136 of the third embodiment may include a coupler 1632 capable of splitting or coupling laser beams. The coupler 1362 generally refers to an optical part configured to split an optical signal from a single optical fiber with respect to a plurality of optical fibers, or to concentrate optical signals from a plurality of optical fibers into a single optical fiber.

The coupler 1362 may use various splitting ratios, for example, 50:50, 70:30, and 80:20. For example, using a single coupler 1362, a laser beam may be split into two, three, four, or five laser beams. In addition, one or more couplers 1362 may be provided. The plurality of couplers 1362 may be disposed in series or in parallel.

Also, a connector (not shown) may be provided between the couplers 1362, and may connect the couplers 1362 or optical fibers. The connector refers to a connecting part that is configured to connect optical fibers or to connect an optical fiber to a terminal device, and to which an optical fiber is detachably attached. The connector may be used in a communication device with an optical fiber code. In terms of functional and manipulating characteristics, the connector may be similar to a machine connector based on a usage pattern. However, the connector may have a variety of structures and types.

As described above, it is possible to split a laser beam into a desired number of laser beams and to individually adjust each laser beam by diversifying a laser splitting ratio by the coupler 1362 or the arrangement of the couplers 1362.

Using the controller 132, 134, or 136, the bundled optical fiber probe 10 may individually control the presence of irradiation by the forward irradiation optical fiber 110 and the side irradiation optical fiber 120 or an irradiation direction, and may also adjust the laser power of a laser beam that passes through each of the forward irradiation optical fiber 110 and the side irradiation optical fiber 120.

A glass tube (not shown) for protecting the bundled optical fiber probe 10 may be provided at the end of the bundled optical fiber probe 10. The glass tube may be formed using a material having a heat-resisting property, a chemically resistant property, and a high optical property, such as quartz glass. The glass tube may be configured to have a thickness of about 0.4 mm sufficient to endure an impact and pressure. Also, the glass tube may have an inner diameter corresponding to an outer diameter of the bundled optical fiber probe 10 so that the bundled optical fiber probe 10 may be sufficiently inserted.

Figure 6A:
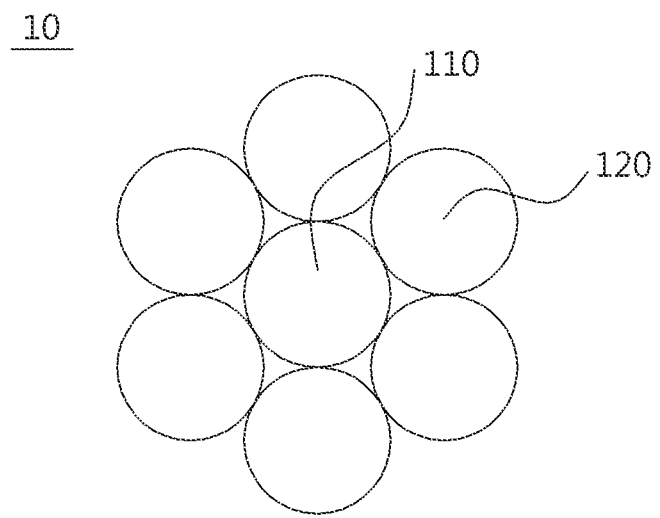
FIGS. 6A, 6B, and 6C are modified examples of a bundled optical fiber probe according to an embodiment.
Figure 6B:
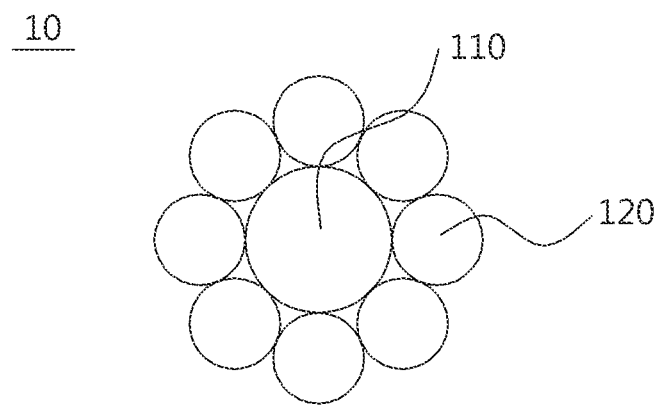
Figure 6C:
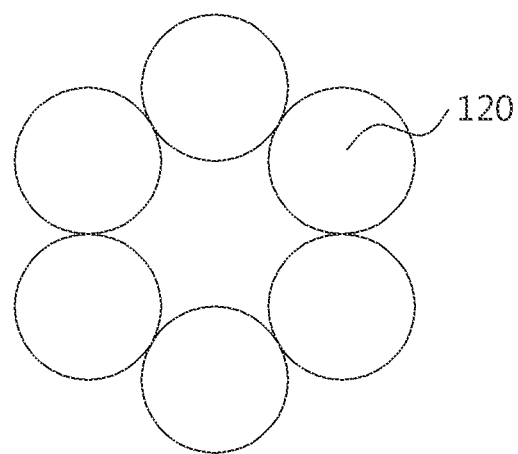
Figure 7A:
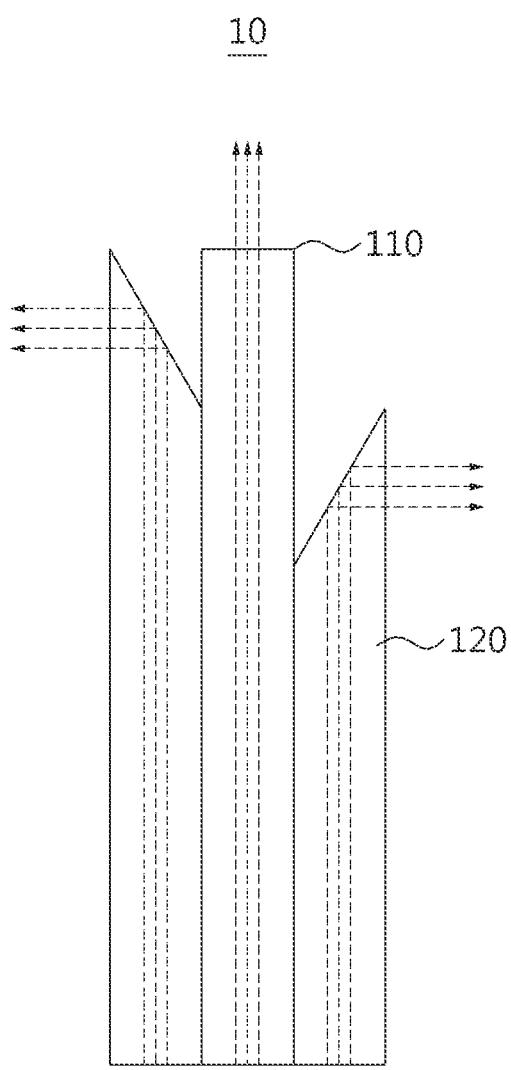
FIGS. 7A and 7B are optical fibers disposed at different heights in a bundled optical fiber probe according to an embodiment.
Figure 7B:
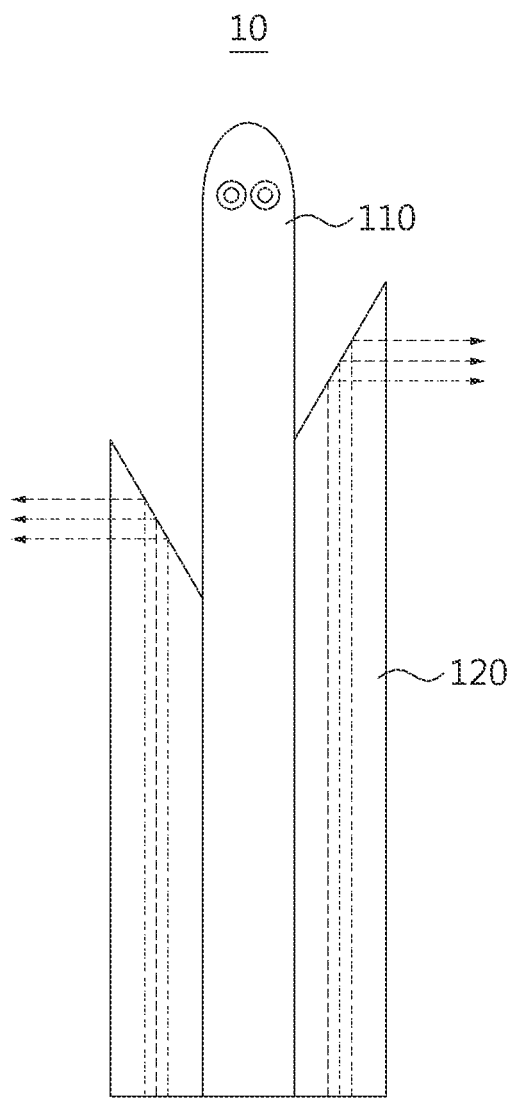
Figure 8:
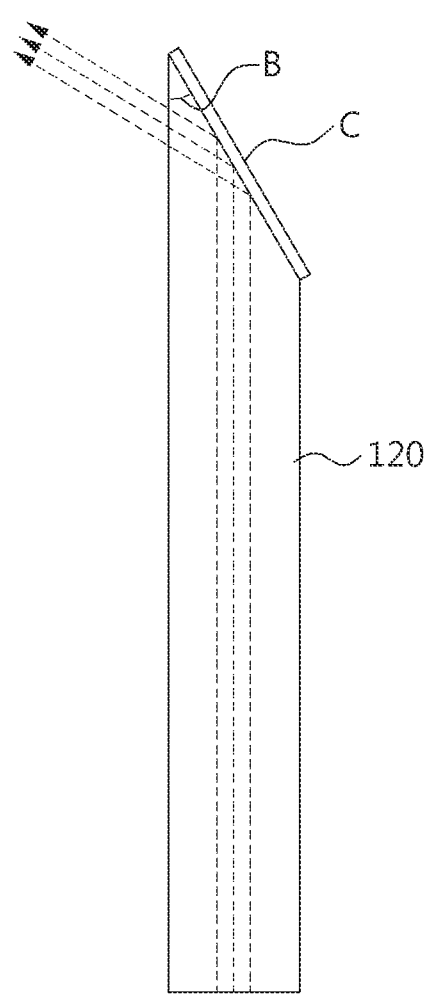
FIG. 8 illustrates an example of a metal reflective film formed on a side irradiation optical fiber.

FIGS. 6A, 6B, and 6C are modified examples of a bundled optical fiber probe according to an embodiment, FIGS. 7A and 7B are optical fibers disposed at different heights in a bundled optical fiber probe according to an embodiment, and FIG. 8 illustrates an example of a metal reflective film formed on a side irradiation optical fiber.

Referring to FIGS. 6A, 6B, and 6C, the forward irradiation optical fiber 110 and the side irradiation optical fiber 120 may be variously combined.

In FIG. 6A or 6B, a plurality of side irradiation optical fibers 120 encompasses the forward irradiation optical fiber 110 based on a single forward irradiation optical fiber 110. Here, the forward irradiation optical fiber 110 and the side irradiation optical fiber 120 may have the same diameter or different diameters. For example, the diameter of the forward irradiation optical fiber 110 and the diameter of the side irradiation optical fiber 120 may be the same as each other or may differ from each other. Further, each of the side irradiation optical fibers 120 may have a different diameter. When the side irradiation optical fiber 120 has a relatively small diameter, a relatively large number of side irradiation optical fibers 120 may be provided to encompass the forward irradiation optical fiber 110.

As illustrated in FIG. 6C, the bundled optical fiber probe 10 may include only the side irradiation optical fiber 120 without including the forward irradiation optical fiber 110. The bundled optical fiber probe 10 including only the side irradiation optical fibers 120 may be useful when there is a need to irradiate laser beams in lateral directions excluding a forward direction. Although FIG. 6C illustrates a bundle of the side irradiation optical fibers 120 in a circular shape, it is only an example. The bundle may be provided in a variety of shapes.

Referring to FIGS. 7A and 7B, the side irradiation optical fibers 120 may be disposed at different heights. Accordingly, laser beams having passed through the side irradiation optical fibers 120 may be reflected to different planes. Accordingly, it is possible to irradiate a laser beam in a desired direction of a 3D space. For example, referring to FIG. 7A, it is possible to irradiate laser beams toward a forward through the forward irradiation optical fiber 110 and toward two sides having different heights through the side irradiation optical fibers 120. Further, referring to FIG. 7B, when a laser beam by the forward irradiation optical fiber 110 is blocked by the aforementioned controller, it is possible to irradiate laser beams toward two sides having different heights through the side irradiation optical fibers 120.

Referring to FIG. 8, a metal reflective film C may be formed on an inclined surface of the side irradiation optical fiber 120. The metal reflective film C may be formed by forming the inclined surface on the side irradiation optical fiber 120. The metal reflective film C may be formed by coating the inclined surface with a reflective metal, for example, silver (Ag). In general, metal elements of the periodic table have a characteristic of showing a unique metal gloss by reflecting light. Thus, in addition to silver, other metal elements such as nickel and aluminum may be used.

When the metal reflective film C is formed on the inclined surface, a laser beam having passed through the side irradiation optical fiber 120 may enhance the reflectivity by the metal reflective film C.

As described above, a reflection angle of the laser beam may be variously determined by determining the angle of inclination B of the side irradiation optical fiber 120 and the metal reflective film C based on the total internal reflection.

FIG. 9 illustrates a bundled optical fiber probe manufacturing apparatus 20 according to an embodiment.

Referring to FIG. 9, the bundled optical fiber probe manufacturing apparatus 20 according to an embodiment may include an optical fiber chuck 210, a chuck fixing jig 220, a polymer tube 230, and a circle clamp 240.

The optical fiber chuck 210 may fix a forward irradiation optical fiber or a side irradiation optical fiber, and may be rotatably mounted to the chuck fixing jig 220. Using the rotation of the optical fiber chuck 210, an irradiation direction of the side irradiation optical fiber may be aligned and the irradiation direction of the side irradiation optical fiber may be adjusted.

The chuck fixing jig 220 may be mounted to the optical fiber chuck 210 and may fix the optical fiber chuck 210, and may include the number of holes corresponding to the number of forward irradiation optical fibers or side irradiation optical fibers of the bundled optical fiber probe 10. For example, when a total number of optical fibers is five, five optical fiber chucks 210 are required to fix the five optical fibers. Accordingly, five holes are to be formed on the chuck fixing jig 220 to fix the five optical fiber chucks 210.

Also, the polymer tube 230 may be disposed coaxially in a lengthwise direction of the optical fiber with respect to the optical fiber chuck 210.

The polymer tube 230 may be formed using a soft polymer material and may internally pass and collect the optical fibers. The polymer tube 230 may minimize damage to a optical fiber by the circle clamp 240, and may protect the optical fiber from an external impact when manufacturing the bundled optical fiber probe 10.

Also, the circle clamp 240 may be provided to fix the polymer tube 230 or to fix a glass tube that wraps around an end of the bundled optical fiber probe 10.

The circle clamp 240 refers to a device capable of collecting and fixing optical fibers. When a plurality of circle clamps 240 is provided to coaxially collect and align optical fibers, the plurality of circle clamps 240 may fix the optical fibers. Also, the circle clamp 240 may coaxially align the optical fiber and the glass tube. The circle clamp 240 may include an aperture and thus, may adjust an opening level of the aperture to correspond to an outer diameter of the bundled optical fiber probe 10 using, for example, a diaphragm method.

The bundled optical fiber probe 10 may be manufactured as follows using the bundled optical fiber probe manufacturing apparatus 20.

A forward irradiation optical fiber or a laterally polished side irradiation optical fiber may be inserted into the optical fiber chuck 210 and be fixed therein. Here, optical fibers may be inserted using a variety of shapes.

The optical fiber chuck 210 in which the optical fibers are fixed is mounted to the chuck fixing jig 220. The optical fiber chuck 210 may be mounted to the chuck fixing jig 220 by inserting the optical fiber chuck 210 in a hole formed on the chuck fixing jig 220. The optical fiber chuck 210 is rotatable in the hole.

A bundle of forward irradiation optical fibers or side irradiation optical fibers is inserted into the polymer tube 230 to minimize the damage to the optical fibers from an outside.

The optical fibers inserted in the polymer tube 230 pass through the circle clamp 240. For alignment of the side irradiation optical fibers, the circle clamp 240 is fastened while maintaining an interval in which the optical fibers may move. In addition, a location of the circle clamp 240 may be readjusted to locate the circle clamp 240 on a vertical line to the chuck fixing jig 220.

In this instance, a height of an optical fiber may be adjusted by monitoring an end of the optical fiber using an optical microscope, and a direction of the optical fiber may be adjusted by rotating the optical fiber chuck 210 to fix the optical fiber in an accurate laser irradiation direction.

A tip of the optical fiber is cleaned after adjusting the direction and the height of the optical fiber. For example, the tip of the optical fiber may be cleaned with distilled water.

The cleaned tip of the optical fiber is inserted into the glass tube and the glass tube is fixed using the circle clamp 240. Using a visible ray laser, it is possible to verify and readjust a location of the tip of the optical fiber and an irradiation direction.

Adhesives may be applied between the glass tube and optical fibers using a syringe for bonding between optical fibers and bonding between the optical fibers and the glass tube. The applied adhesives may be hardened using ultraviolet (UV) rays and thermosetting.

Once the adhesives are hardened, a part for aligning the bundled optical fiber probe 10 that includes the optical fiber chuck 210, the chuck fixing jig 220, and the circle clamp 240 is removed.

Through the above process, the bundled optical fiber probe 10 is manufactured. Using the bundled optical fiber probe manufacturing apparatus 20, it is possible to adjust irradiation directions and heights of optical fibers and to protect the optical fibers from an external impact.

Although a few embodiments have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

Included in the detailed description

What is claimed is:

1. A bundled optical fiber probe comprising:
a forward irradiator including a forward irradiation optical fiber disposed at the center of the bundled optical fiber probe, an end of the forward irradiation optical fiber being provided as a flat surface; and
a side irradiator including a side irradiation optical fiber disposed at the periphery of the forward irradiator, an inclined surface being formed at an end of the side irradiation optical fiber to laterally reflect a laser beam,
wherein the forward irradiator and the side irradiator are formed as a single bundle,
the side irradiation optical fiber is provided as a plurality of side irradiation optical fibers, and the inclined surface is formed at the end of each of the side irradiation optical fibers, wherein the plurality of side irradiation optical fibers are radially disposed to be separate from each other along the periphery of the forward irradiation optical fiber and respective ends of the side irradiation optical fibers are disposed on the same plane or different planes, and
the laser beam is transferred straight to an inspection target in the same direction as the incident direction at the end of the forward irradiation optical fiber, while laser beams are reflected laterally by the inclined surface at the ends of the side irradiation optical fibers to irradiate in an outer lateral radial form on the same plane or different planes, and thus laser beams are three-dimensionally irradiated in directions corresponding to the number of forward irradiation optical fiber and side irradiation optical fibers.

2. The bundled optical fiber probe of claim 1, further comprising:
a controller configured to individually control the forward irradiation optical fiber and the side irradiation optical fiber,
wherein the controller is configured to individually control a laser irradiation direction or a laser power.

3. The bundled optical fiber probe of claim 1, wherein the controller comprises:
a laser beam splitter configured to split the laser beam into the same number of laser beams as the number of forward irradiation optical fibers and side irradiation optical fibers;
a beam switch configured to selectively block a path of the laser beam; and
a lens configured to transmit the laser beam having passed through the beam switch to the forward irradiation optical fiber or the side irradiation optical fiber.

4. The bundled optical fiber probe of claim 1, wherein the controller comprises a coupler configured to split and couple the laser beam, and
a plurality of couplers is provided in series or in parallel.

5. The bundled optical fiber probe of claim 1, wherein inclined surfaces are formed at different angles on the side irradiation optical fibers, and an angle of the inclined surface is selected based on a total internal reflection of the laser beam.

6. The bundled optical fiber probe of claim 1, wherein a laser irradiation angle is changed by coating the inclined surface of the side irradiation optical fiber with a reflective metal and thereby forming a metal reflective film.

7. The bundled optical fiber probe of claim 1, wherein the forward irradiation optical fibers or the side irradiation optical fibers have different diameters or are disposed at different heights.

8. The bundled optical fiber probe of claim 1, further comprising:
a glass tube configured to encompass an end of the bundled optical fiber probe,
wherein an inner diameter of the glass tube corresponds to an outer diameter of the bundled optical fiber probe.

* * * * *